Aug. 31, 1926.

E. TIMBS 1,598,405

HIGH SPEED DRIVE CONNECTION FOR DRAW WORKS

Filed Feb. 4, 1924

Inventor
Edward Timbs
By Lyon & Lyon
Attorney

Patented Aug. 31, 1926.

1,598,405

UNITED STATES PATENT OFFICE.

EDWARD TIMBS, OF LOS ANGELES, CALIFORNIA, ASSIGNOR TO UNION TOOL COMPANY, OF TORRANCE, CALIFORNIA, A CORPORATION OF CALIFORNIA.

HIGH-SPEED DRIVE CONNECTION FOR DRAW WORKS.

Application filed February 4, 1924. Serial No. 690,523.

This invention relates to rotary draw-works such as used in drilling deep wells. In its construction, the draw-works usually includes a drum shaft carrying a cable drum for raising and lowering loads within the well, and a line shaft opposite the drum shaft with driving connections between the shafts for driving the drum at different speeds. In recent practice these driving connections have included a high-speed driving connection for driving the drum at a high speed without necessitating any substantial increase in the speed of the engine which drives the line shaft.

The high-speed driving connection just referred to has heretofore included a sprocket wheel rigid with the drum shaft and a sprocket wheel loose on the line shaft and connectible to the line shaft by a clutch; the result of this is that when the high-speed clutch is open, as it is when a load is running down by gravity in the well, the sprocket wheel on the drum shaft drives its sprocket chain at a dangerous speed; as a matter of fact, this chain frequently becomes broken in this way. Such breakages are very natural in view of the fact that the speed of rotation of the drum at such a time is sometimes as great as 1000 revolutions per minute.

The general object of this invention is to overcome this difficulty and to provide a rotary draw-works including a high-speed driving connection, but with the parts so organized that when a load is running down in the well the danger of breaking the high-speed sprocket chain will be eliminated; also to locate the high-speed drive connection so as to increase the safety to the operators of the mechanism and to eliminate vibration and jars to the mechanism such as are incidental to the use of an ordinary high-speed clutch.

A rotary draw-works of the type referred to usually includes a frame with two end posts and an intermediate post located adjacent one head of the drum. One of the objects of this invention is to provide a compact construction enabling the high-speed driving connection to be located between the head of the drum and the intermediate post, thereby increasing its safety, and to provide an organization which will enable an efficient type of friction clutch to be used as in the high-speed connection, operating to avoid jars to the mechanism, as suggested, and rendering the operation of the high-speed driving connection more flexible.

Further objects of the invention will appear hereinafter.

The invention consists in the novel parts and combination of parts to be described hereinafter, all of which contribute to produce an efficient high-speed drive connection for draw-works.

A preferred embodiment of the invention is described in the following specification, while the broad scope of the invention is pointed out in the appended claims.

Figure 1:
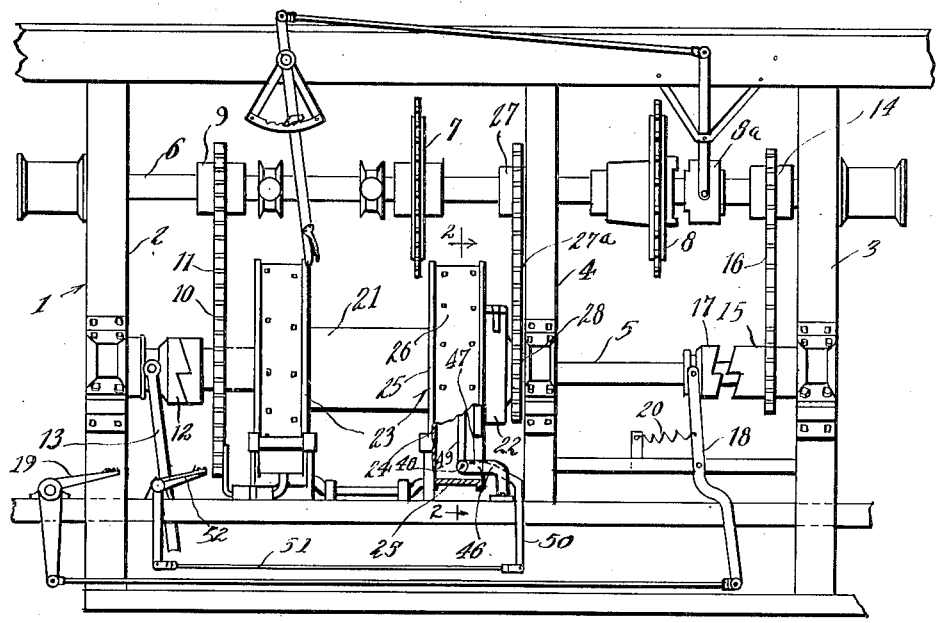
Figure 1 is a side elevation of a rotary draw-works embodying my invention, certain parts being broken away and partially shown in section to illustrate the invention.

The rotary draw-works includes a frame 1 comprising two end posts 2 and 3 and an intermediate post 4. In the frame is rotatably mounted the drum shaft 5 which is arranged to be driven at three different speeds from a line shaft 6 rotatably supported on the upper part of the frame 1. The line shaft 6 is driven from the engine by a sprocket wheel 7 carrying a driving chain (not illustrated) and the line shaft also carries a loose sprocket wheel 8, the sprocket chain of which drives a rotary table. A clutch 8ª is provided to connect or disconnect the table drive at will.

On one end of the frame is a low speed driving connection between the line shaft 6 and the drum shaft 5, which may include a small sprocket wheel 9 on the line shaft and a large sprocket wheel 10 aligning with it and connected to it by a sprocket chain 11.

A one-way clutch 12 is provided for connecting the sprocket wheel 10 to the shaft 5 at will and this clutch is controlled by a suitable clutch lever 13. At the other end of the frame an intermediate or second speed driving connection is provided which may include a small sprocket wheel 14 in line with a sprocket wheel 15 on the line shaft, the two sprocket wheels being connected by a sprocket chain 16.

The sprocket wheel 15 may be connected at will to the drum shaft 5 by means of a one-way clutch 17 having an operating lever 18 which may be connected to a foot lever 19 at the operator's end of the draw-works. This lever is preferably independent of the lever 13. A spring 20 may be provided for normally holding the lever 18 in the position to hold the clutch 17 open.

Figure 4:
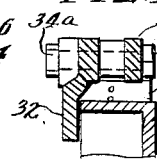
Fig. 4 is a detail section taken about on the line 4—4 of Figure 2.
Figure 3:
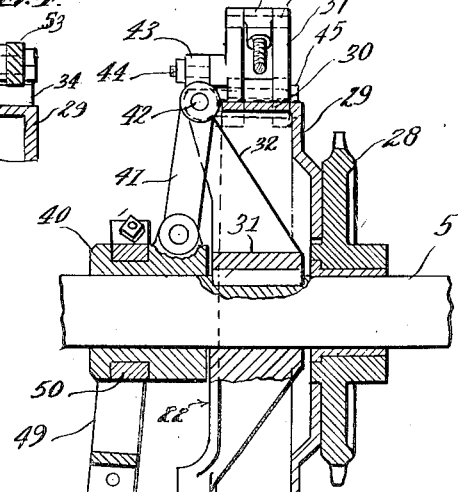
Fig. 3 is an ideal section taken about on the line 3—3 of Figure 2.

The cable drum 21 is fixed to shaft 5 and mounted between the two posts 2 and 4 with one end of the drum adjacent to the intermediate post. For the sake of safety I prefer to place the high-speed driving connection between the drum and the intermediate post 4. In order to accomplish this and at the same time to provide a construction which will eliminate the driving of the high-speed connection when the high-speed clutch is open, I mount the high-speed clutch on the drum shaft 5. In order to avoid jars in the operation of this clutch, I prefer to employ a friction clutch 22. A suitable clutch for this purpose is illustrated in detail in Figures 3 and 4.

The drum 21 is provided with the usual brake flanges, one at each end, so that the head 23 of the drum which is disposed adjacent to the post 4 comprises a disc body 24 and a flange 25 which carries the brake band 26. This flange 25 projects away from the disc 24 and toward the post 4, the result of which is that a space is formed in the interior of the head; in other words, the drum is open at its end so as to permit access to the space surrounded by the flange 25. This space within the head enables me to provide a very compact construction and organization of parts at this point so that I can employ a friction clutch of the type illustrated without necessitating any material reduction in the length of the drum 21.

Figure 2:
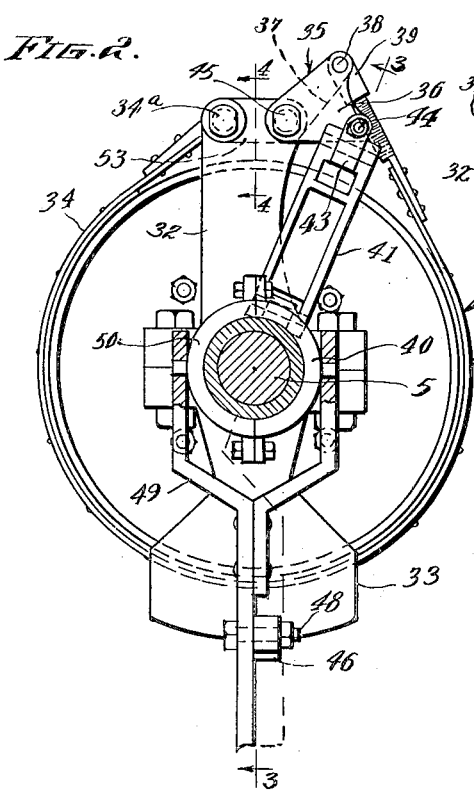
Fig. 2 is a section taken about on the line 2—2 of Figure 1.

The high-speed driving connection comprises a sprocket wheel 27 rigidly secured to the line shaft 6 and in alignment with a sprocket wheel 28 which is loose on the shaft 5 (see Figure 3), but rigidly secured to the disc of a friction drum 29 which constitutes one of the members of the friction clutch 22. In order to reduce vibration to a minimum the sprocket chain 27ᵃ of this drive lies close against the side of the intermediate post 4. The flange 30 of the friction drum 29 projects away from the disc of the friction drum, and on the shaft 5, in alignment with the flange 30, there is mounted a hub 31 of a band arm 32, the said arm being counterweighted by a suitable counterbalance 33. At one side of this arm (see Figure 2) the fixed end of a brake band 34 is anchored on an anchor pin 34ᵃ; this brake band extends around on the flange 30 and its movable end is attached to a rocker or shackle 35, said shackle including a substantially triangular plate 36 on one side and an arm 37 on the other side; the arm and the plate are connected by a pin 38. This pin carries a knuckle 39 to which the free end of the friction band 34 is attached.

In order to tighten the band 34 and close the friction clutch, the clutch is provided with a sliding collar 40 mounted to slide on the shaft 5 and carrying a strut link 41, the outer end of which is pivotally attached by a pin 42 to a small universal knuckle 43, the upper portion of said knuckle 43 being attached by a swivel pin 44 to the lower portion of the rocker 35.

With this construction of clutch it will be evident, if the collar 40 be moved inwardly or toward the hub 31, the link 41 will shove outwardly on the rocker 35 so as to rock the same about its fulcrum pin 45 and this will tighten up the band 34 on the flange 30. In this way the clutch is closed when desired. In order to enable the clutch to be closed at will I provide a bracket 46 (see Figure 1) which is secured on the frame 1, and the upper portion of this bracket is offset laterally and horizontally so as to form a neck 47 projecting into the interior or space in the head of the drum. The end of this neck carries a fulcrum pin 48 for a yoke 49 which engages a slip ring 50 on the collar 40, said yoke constituting a part of the actuating lever for the clutch; the actuating lever has its own independent controlling lever or arm 50 which extends downwardly and is attached to a link 51 which extends over to a treadle lever 52 mounted at a point on the frame 1 which is near the position of the operator of the draw-works.

In practice, it is understood, of course, that the cable which is coiled on the drum 21 extends up to the crown block of the derrick and down into the well to support the load in the well. By opening the clutch 22, the load can be permitted to run down by gravity in the well, at which time the drum 21 will be rotated at a high velocity. When this occurs, however, the use of my invention eliminates the driving of the sprocket chain 27ᵃ which connects the sprocket wheel 27 with the sprocket wheel 28, and hence danger of breaking the chain in this way is eliminated.

By reason of the fact that a certain amount of slip will take place between the band 34 and the flange 30 just as the clutch is being closed, the jar or shock is avoided which is incidental to the use of a jaw clutch, and enables the driven mechanism to attain its driven speed gradually; this gives the meecranism a desirable flexibility and makes it operate easily.

In order to produce a strong mounting for the ends of the brake band 34, the ends of the pins 34a and 45 are connected by a stout link 53.

One of the advantageous features of my invention lies in placing the high-speed drive connection adjacent to the intermediate post of the frame. This locates the high speed drive near the middle of the frame and increases the safety. It also brings the drive nearer to the sprocket wheel 7 where the drive comes on to the line shaft, one result of which is that there is a very short portion of the line shaft in torsion when the drum is being driven at high speed.

It is understood that the embodiment of the invention described herein is only one of the many embodiments this invention may take and I do not wish to be limited in the practice of the invention, nor in the claims, to the particular embodiment set forth.

What I claim is:—

1. In a rotary draw-works, the combination of a frame having end posts and an intermediate post, a drum shaft supported on the frame, a drum carried on the drum shaft having a head lying adjacent the intermediate post, said head having a disc body with a brake flange projecting from the disc and toward the intermediate post whereby a space is formed within the drum head between the post and the disc, a driving connection to the drum shaft including a clutch member on the drum shaft, a bracket projecting into the said space in the interior of the head, an actuating lever mounted on the bracket, and a clutch member controlled by the actuating lever and mounted on the drum shaft to cooperate with the first named clutch member.

2. In a rotary draw-works, the combination of a frame having end posts and an intermediate post, a drum shaft supported on the frame, a drum carried on the drum shaft having a head lying adjacent the intermediate post, said head having a disc body with a brake flange projecting from the disc and toward the intermediate post whereby a space is formed within the drum head between the post and the disc, a driving connection to the drum shaft including a clutch member located near the end of the drum, a clutch member with an operating collar mounted to slide on the shaft adjacent the said space in the interior of the head, a bracket projecting into the said space, an actuating lever mounted on the bracket and engaging the sliding collar for actuating the same, and a foot lever connected with the actuating lever to close the clutch at will.

3. In a rotary draw-works, the combination of a frame having end posts and an intermediate post, a drum shaft supported on the frame, a drum carried on the drum shaft having a head lying adjacent the intermediate post, said head having a disc body with a brake flange projecting from the disc and toward the intermediate post whereby a space is formed within the drum head between the post and the disc, a driving connection between the line shaft and the drum shaft including a sprocket chain, a sprocket wheel rigid on the line shaft and a sprocket wheel loose on the drum shaft, said last named sprocket wheel being located between the said drum head and the intermediate post, a clutch for connecting the last named sprocket wheel with the drum shaft to drive the drum, and including a sliding collar mounted on the shaft between the head and the post, a bracket projecting into the said space in the interior of the head, an actuating lever mounted on the bracket and engaging the sliding collar for actuating the same, and a controlling lever connected with the actuating lever to close the clutch at will.

4. In a rotary draw-works, the combination of a frame having end posts and an intermediate post, a drum shaft supported on the frame, a drum carried on the drum shaft, a line shaft, a low-speed driving connection between the line shaft and the drum shaft with its corresponding clutch, an intermediate-speed driving connection between the line shaft and the drum shaft with its corresponding clutch, a high-speed driving connection between the line shaft and the drum shaft including a sprocket chain, a sprocket wheel rigid on the line shaft and a sprocket wheel loose on the drum shaft, said last named sprocket wheel being located between the drum and the intermediate post, said drum having a head adjacent the intermediate post with a disc body and a brake flange projecting from the disc and toward the intermediate post whereby a space is formed within the drum head between the post and the disc, a friction clutch on the drum shaft between the drum head and the intermediate post and including a sliding collar mounted on the shaft between the head and the post, a bracket projecting into the said space in the interior of the head, an actuating lever mounted on the bracket and engaging the sliding collar for moving the same, and a controlling lever connected with the actuating lever to close and open the friction clutch at will, the said loose sprocket wheel on the drum shaft co-operating with the clutch, when the clutch is open, to permit the drum to rotate freely at a high speed in lowering a load into the well without actuating the sprocket chain.

5. In a rotary drawworks for deep wells, the combination of a frame including two end posts and an intermediate post, a drum shaft rotatably supported on the three posts, a drum carried on the drum shaft, a line shaft, a low-speed driving connection between the line shaft and the drum shaft with its corresponding clutch and lever, an intermediate speed driving connection between the line shaft and the drum shaft lying adjacent to one of the end posts with its corresponding clutch, and having a lever independent of the first named lever, a high-speed driving connection between the line shaft and the drum shaft including a sprocket chain, a sprocket wheel rigid on the line shaft and a sprocket wheel loose on the drum shaft, and a friction clutch on the drum shaft for connecting the last named sprocket wheel with the drum shaft and having a controlling lever for the clutch, said friction clutch operating, when open, to enable the drum to rotate freely at a high speed in lowering a load into the well without actuating the sprocket chain, said drum having a projecting flange operating to form a space within the end of the drum adjacent to the clutch, and operating means for the clutch extending into the said space.

Signed at Torrance, Calif., this 29th day of January, 1924.

EDWARD TIMBS.